US006287614B1

(12) United States Patent
Peiffer

(10) Patent No.: US 6,287,614 B1
(45) Date of Patent: Sep. 11, 2001

(54) METHOD AND APPARATUS FOR IMPROVING THE ORGANOLEPTIC PROPERTIES OF ALCOHOLIC AND OTHER BEVERAGES

(76) Inventor: Jacqueline Peiffer, 22 Lincoln Blvd., Bethpage, NY (US) 11714

( * ) Notice: Subject to any disclaimer, the term of this patent is extended or adjusted under 35 U.S.C. 154(b) by 0 days.

(21) Appl. No.: 09/455,680

(22) Filed: Dec. 7, 1999

Related U.S. Application Data

(60) Provisional application No. 60/112,301, filed on Dec. 14, 1998, provisional application No. 60/115,201, filed on Jan. 7, 1999, and provisional application No. 60/115,202, filed on Jan. 7, 1999.

(51) Int. Cl.[7] .................................................. B01D 35/06
(52) U.S. Cl. ...................... 426/237; 426/330.4; 426/592; 99/275; 210/222
(58) Field of Search ............................... 426/237, 330.4, 426/592; 99/275; 210/222

(56) References Cited

U.S. PATENT DOCUMENTS

| | | | | |
|---|---|---|---|---|
| 4,872,401 | * | 10/1989 | Lee | 99/275 |
| 4,888,113 | * | 12/1989 | Holcomb | 210/222 |
| 5,113,751 | | 5/1992 | Holcomb | 99/286 |
| 5,500,121 | * | 3/1996 | Thornton et al. | 210/222 |
| 5,556,654 | * | 9/1996 | Fregeau | 426/234 |
| 5,860,353 | | 1/1999 | Ceccarani | 99/277.1 |

FOREIGN PATENT DOCUMENTS

| | | | |
|---|---|---|---|
| 1196188 | * | 10/1998 | (CN) . |
| 3922971 | * | 1/1991 | (DE) . |
| 4013445 | * | 10/1991 | (DE) . |
| 4130755 | * | 3/1993 | (DE) . |
| 0348551 | * | 1/1990 | (EP) . |
| 0 828 001 | * | 11/1998 | (EP) . |
| 11216476 | * | 8/1999 | (JP) . |
| WO 90/02791 | * | 3/1990 | (WO) . |
| WO 96/27302 | * | 9/1996 | (WO) . |
| WO 98/54291 | * | 12/1998 | (WO) . |

* cited by examiner

*Primary Examiner*—Nina Bhat

(57) ABSTRACT

A method and apparatus for improving the organoleptic properties of various alcoholic beverages by reducing the sensory perception of acids and tannins in wine, brandies, sherries, cognacs, spirits, beer, tea, coffee and fruit juice, including but not limited to any alcoholic beverages that have been aged in wood barrels or had the addition of wood or wood chips added to improve or enhance the flavor. The product to be treated can be either placed upon, inside or channeled through a magnetic field produced by permanent magnets, strong enough to achieve the desired results. The minimum gauss strength of said magnets should be strong enough to achieve said results depending upon whether the liquid to be treated is stationary, contained in a bottle, barrel or tank, or is moving through a pipe line during the manufacturing process.

8 Claims, 3 Drawing Sheets

METHOD AND APPARATUS FOR IMPROVING THE ORGANOLEPTIC PROPERTIES OF ALCOHOLIC AND OTHER BEVERAGES

This application claims benefit under 35 USC 119(e) of Provisional Patent applications; 60/112,301 filed Dec. 14, 1998 and 60/115,201 and 60/115,202 both filed Jan. 7, 1999.

BACKGROUND OF THE INVENTION

The present invention relates to a method and means for enhancing the organoleptic qualities, while reducing the sensory perception of tannins and acid in wine, brandies, sherries, ports, cognac, spirits, beer, coffee, tea, fruit juice, and or any alcoholic beverages, including but not restricted to those that have been aged in wood barrels or had the addition of wood or wood chips added to the beverage to enhance the taste, by means of a magnetic field.

It is known that many alcoholic beverages are aged in wood barrels or have wood or wood chips added to the product for a time to allow the characteristics of the wood to enhance the organoleptic properties of the beverage including flavor and odor.

Tannins are the harsh, bitter, astringent, dry tasting substances, imparted by grape skins, seeds, stems and or the use of wood barrels, strips or chips, which allow wines to age and or impart a variety of different taste characteristics to wines and other alcoholic beverages. In wine these tannins will dissipate over the years and thus in general an older wine will have a softer, smoother and fruitier taste than it did as a young wine. In beer and spirits, tannins are generally derived from a variety of new and used wood barrels, in which the spirits are allowed to aged for a period of time, in order to impart the finished product with a variety of taste finishes. As an example, beverages such as malt scotches, sometimes age their product in a variety of new and previously used wood barrels which will impart a variety of different organoleptic properties to their final product, thus producing a diversity of taste selections within a single brand name. This is known as a line extension. In both instances these tannins may impart a harsher taste than might be desired either at the time of bottling or at the time that the product becomes available to the general public for purchase and consumption.

At this time there are several different methods, generally referred to as fining, for reducing tannins prior to bottling, through the use of a variety of substances including egg whites, diatomaceous earth, casein, gelatin and other chemical substances. These methods do not always remove the desired level of tannins in one application and may have to be repeated. This is very costly in terms of time and manpower as each of these methods are accomplished by manual labor.

When any one of the above sited alcoholic products are released to the public they generally have not been given enough time to age and reach their full maturity and flavor, through the use of climate controlled wine and spirits cellars, before they are released to the public. The additional expense to the manufacturer of cellaring a product for additional years, until it reached its optimum maturity, would add considerable cost to the finished product. The general public is impatient and generally consume these products before they are at their best. This can result in a negative public perception of the winery, spirits or beer manufacturer, store or restaurant in which they were purchased.

The use of magnets, to reduce acids and tannins, appears heretofore to have been unknown to the science of wine and spirits production and no references have been found in scientific wine publications, textbooks or journals. Despite strong skepticism, every wine maker who blind tested the singular magnetic device shown in FIGS. 1–3, on two of the same bottles of wine, agreed that a positive change in the organoleptic qualities of the wine had taken place. Furthermore, this device is already in successful national distribution through wine and liquor stores, wine tasting rooms, as well as direct marketing consumer sales.

According to this present invention, the reduction in perceived tannins and resulting enhancement of the organoleptic qualities, including taste, odor and mouth feel of these beverages may be accomplished without any health consequences and at negligible cost.

In coffee, tea and some fruit juices the exposure to a magnetic field can reduce the perceived taste of acidity.

PRIOR ART

It is the object of the present invention to provide a simple, safe, permanent, portable, removable and reusable method and means of reducing acids and tannins both for the consumer and manufacturer f a variety of beverages.

Already known are electromagnetic devices for aging wines, brandy, and spirits such as Ceccarani, U.S. Pat. No. 5,860,353, Jan. 19, 1999 incorporated herein by reference. The disadvantage of this devices relates to its use in alcoholic production. Distilled spirits are based upon a measurement of alcohol in an product known as proof level. Said measurement is based upon a scale of 1 to 200 proof. As an example, a spirits product available to the public at 100 proof is actually 50% alcohol by volume. During production most spirits are distilled and stored at 120 proof, this would include brandy, cognac, bourbon and other spirits that are aged in barrels. This level and volume of alcohol presents a potentially volatile and explosive situation in relations to the use of electrical devices. As regards to wine, many professionals feel that the pulsating element of this device shakes the wine much as would happen in transportation and the product then needs days to rest and settle before it can present itself at its optimum best. In addition, though this product is portable, it does require an electrical outlet and is thus generally inconvenient for use at the dining table or restaurant, where a bottle of wine would generally be desired to be within easy reach throughout the meal. Furthermore, this device provides a gauss level of between 10–120 which requires that the beverage be treated for days instead of ½ hour.

Also known is Fregeau, U.S. Pat. No. 5,556,654, Sep. 17, 1996 incorporated herein by reference. In this device a liquid is subjected to opposite magnetic fields up to 3000 gauss as it travels through a tubular magnet. This assembly is inserted in a pipe and may negatively influence the flavor characteristic of the liquid within, through contamination or chemical interaction. This device lacks portability and is not easily multiplied if the need exists for a stronger field to affect the desired changes.

Also known is Holcomb, et al, U.S. Pat. No. 5,113,751, May 19, 1992. This invention relates to removing the bitterness in coffee and tea through the singular and or combined use of magnetic and electromagnetic devices.

Also known is Lee, U.S. Pat. No. 4,872,401, Oct. 10, 1989. This is a multiple layered container with a plurality of magnetic bars inside the walls, with both positive and negative poles influencing the liquid contained within. I have never seen or heard of this device in commercial use.

Other References

The Vintange Enhances, form the Sharper Image catalog, fall of 1998, I believe this may be the Ceccarani, U.S. Pat. No. 5,860,353, January 1999. The disadvantages of this device are as previously stated under Ceccarani. It is no longer available in the Sharper Image catalog. Magnéfique Flav-O-Ring, from Magnetizer. This product came to my attention recently. I have seen and tested the Flav-O-Ring. Not only is it very heavy, more than two pounds, it is very awkward to hold. It comprises two circular magnets, with a wire handle and dipped in red plastic. It was very difficult to discern any difference in the wine that was poured through the center opening. I believe that there is not enough gauss strength here to effect any change to a flowing liquid.

The Omni-Mag, from Russell Biomagnetics. This product recently came to my attention as a pain and healing device. It is comprises of one large, irregular, gear shaped, circular magnet and six small magnets inside a red container with a blue and white label as pictured on the information sheet. The primary focus of this device is as stated to accelerate healing and relieve pain.

The Oxford Companion to Wine, Janis Robinson, 1999 edition, pages 6, 276, 537, 538, 686, 780, 781, 782

BRIEF SUMMARY OF THE INVENTION

The object of this invention is to provide a simple, permanent, portable and reusable magnetic device which will enhance the organoleptic-properties of wines, brandy, cognac, port, sherry, spirits, beer, coffee, tea, fruit juice and other alcoholic beverages.

Another object of this invention is to provide a simple, reusable and portable device to the general public, which can be utilized in the home or taken to a restaurant, that will enhance their enjoyment of a variety of alcoholic beverages through the simple step of placing a bottle, glass, cup or mug on the apparatus and waiting 15 to 30 minutes for the desired amount of change.

Another object of this invention is to provide wineries and distilleries with a safe, economical, permanent, reusable and portable device than can be utilized at any time, or multiple times, during the manufacturing process, to reduce the perception of harsh tannins and acids.

A further object of the invention is to provide a means for reducing perceived tannins, which does not involve the use of chemicals or other substances, while continuing to emphasize the true and desired characteristics of the beverage.

DETAILED DESCRIPTION OF THE INVENTION

A widely accepted theory regarding tannins and their effect upon the taste of an alcoholic product is that tannins, when young, start out as short chain molecules and polymerize, over years, to form larger tannin polymers which then fall out as sediment. This lengthening of the molecular tannic chains over the years, generally causes the taste of a product be perceived as softer, smoother and richer, with a fruitier mouth taste and a lessening of the masking effect of the harsh, younger tannins. This is why an aged red wine is generally smoother and richer in flavor than a younger wine from the same vineyard. The magnetic apparatus in FIGS. 1–4 appears to duplicate the above described results, except instead of years, the same results can be achieved in approximately thirty minutes. Though this is one explanation for the effect the magnet field has on many wine and spirits products I don't wish to be bound by it.

Figure 1:
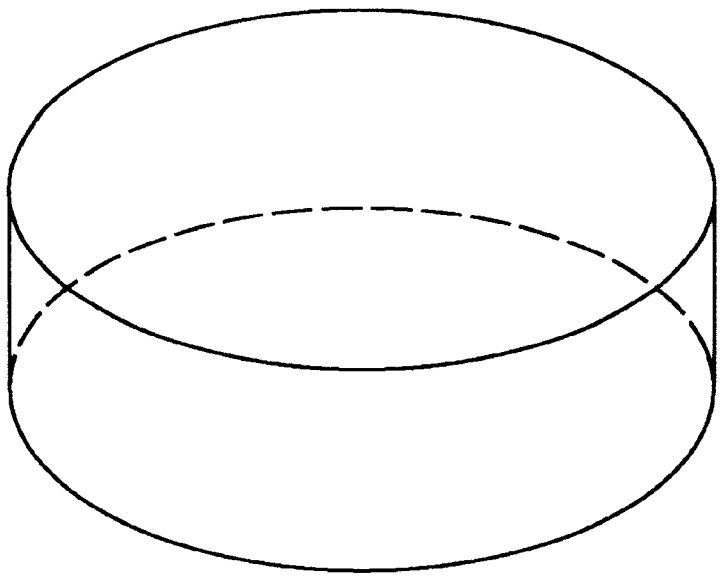
FIG. 1 is a top piece.
Figure 2:
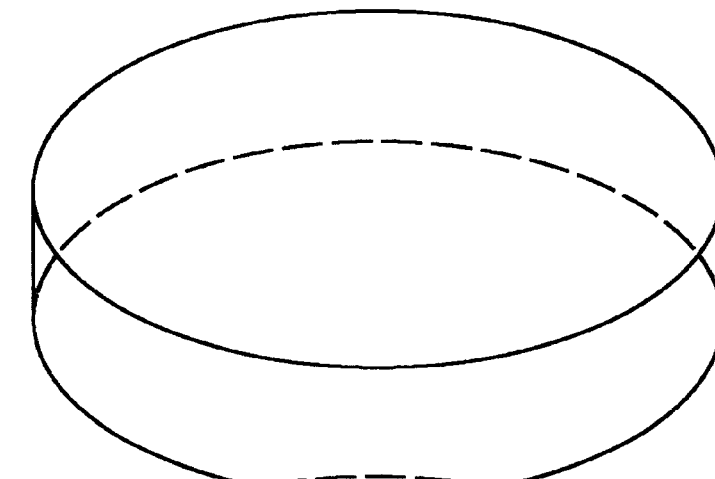
FIG. 2 is a magnet.
Figure 3:
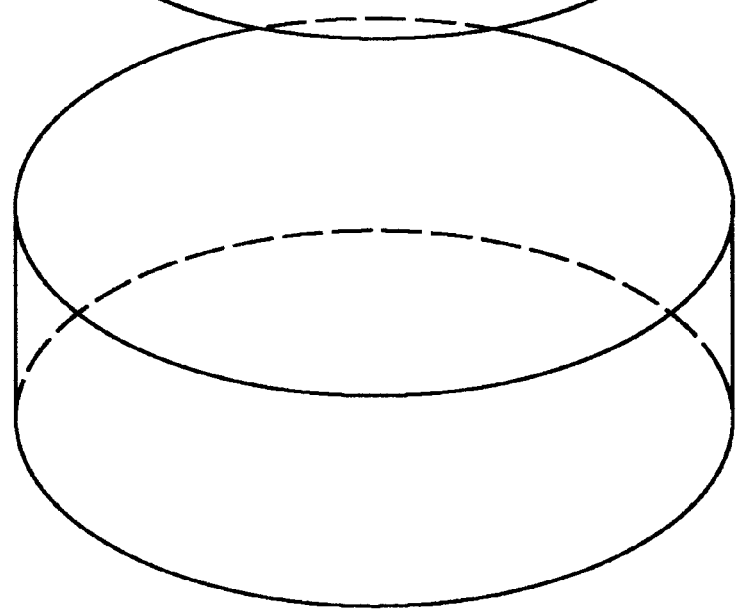
FIG. 3 is a base holder.

The magnetic device as shown in FIGS. 1–3 of the drawings, is comprised of a permanent magnet, sandwiched between a top piece and a base holder, this container can be of a variety of materials including plastic, wood or metal and held together by adhesive means. The container is stamped with a name which has been Trademarked with the U.S. Patent and Trademark Office Ser. No. 75/674,828, Wine Cellar Express. This product has been tested with many wine makers and dozens of wine and spirits professionals. Their general conclusion, regarding the change in taste and odor that occurs in the beverage being treated with the magnet, has been that this invention seems to rapidly polymerize tannins in minutes, much as they would naturally polymerize over the years, resulting in a smoother, richer, fruitier product with enhanced organoleptic properties. These enhanced qualities do not disintegrate over time but rather appear to be permanent and further suggest that these beverages and or tannins have molecular memory.

Treatment of the beverage can include placing the bottle, glass or cup on the apparatus shown in FIGS. 1–4 and waiting approximately 30 minutes for the desired change to occur. When treating a bottle it does not matter whether it is opened or closed, the same results will occur. All of the many wine makers who tested this product used two unopened bottles, of the exact same vintage and type, for their comparison testing. There was unanimous agreement that the bottle placed on the apparatus showed a significant reduction in the perception of harsh tannins.

The permanent magnet may be composed of any material suitable for use and able to achieve the minimum gauss strength required to produce the desired results.

It is the primary objective of this invention to provide a simple, reusable and portable means for reducing the perception of harsh tannins and acids, while enhancing the various organoleptic properties of wine, brandy, sherry, port, cognac, spirits, beers and the like, as well as fruit juice, tea and coffee, both for the individual consumer, at the time of consumption as well as during the manufacturing process, without health consequences and at negligible cost.

Figure 4:
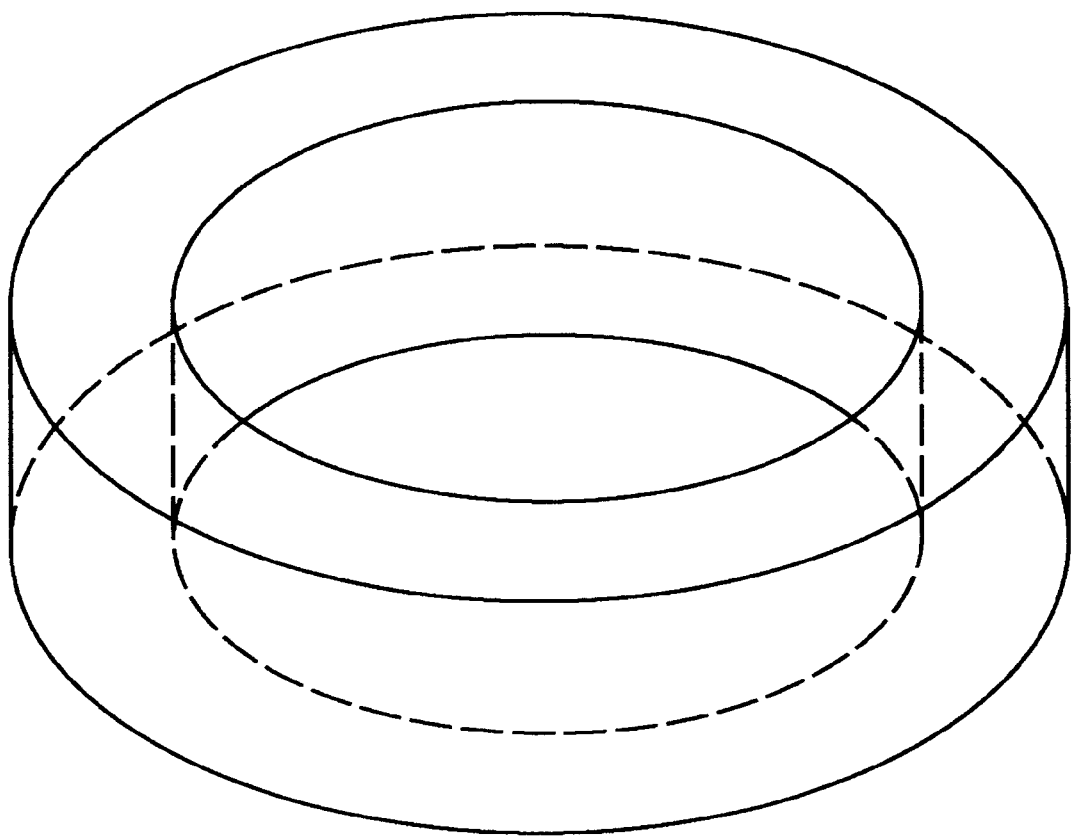
FIG. 4 is circular ring magnet with a center opening of approximately, but not limited to, 3 to 5 inches wide

In accordance with the present invention and referring to FIG. 4, this permanent ring magnet, with a center diameter of approximately 3 to 6 inches and housed in any one of variety of materials, is large enough to hold a bottle within its center diameter or placed upon its surface and is of sufficient gauss strength to produce the desired organoleptic changes.

Figure 5:
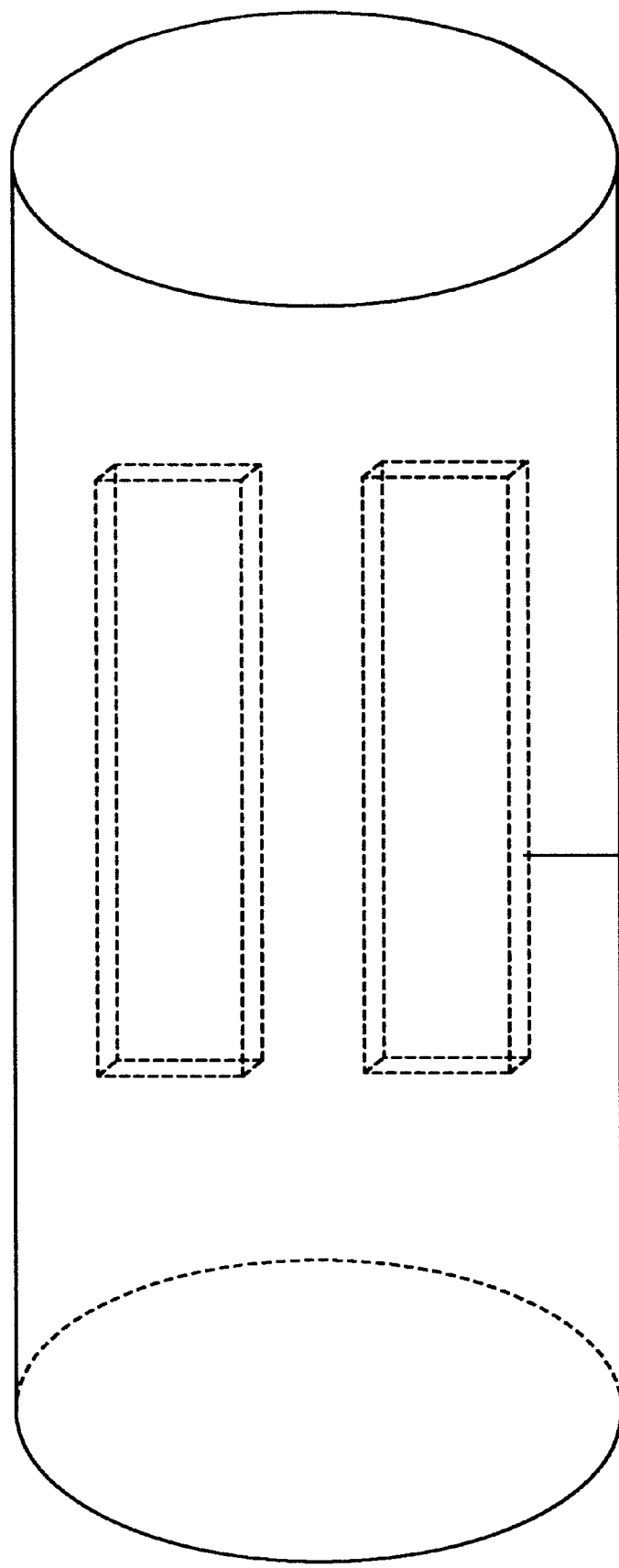
FIG. 5 shows a plurality of magnets arranged around a conventional pipe

In another embodiment of the invention FIG. 5 illustrates a plurality of rectangular magnets, around a conventional pipe, each having north and south magnetic poles at the respective opposite faces therefore and being aligned side by side, that said magnets act to repel one another, whereby the respective singular magnetic poles of said magnets will generate a sufficient magnetic field strong enough to achieve the desired reduction of harsh tannins and or other acids and can be held together through a variety of means which will facilitate the removal and reuse of said device.

Other methods for reducing harsh, young tannins and other acids during the manufacturing process, often referred to as fining, have included the use of egg whites, diatomaceous earth, gelatin and other chemical substances. Each of these operations must be done manually and often have to be repeated to achieve the desired results. This is both costly and time consuming when discussing commercial wineries and distillers that turn out millions of cases of product annually The advantages of this invention provide a simple, safe, permanent, reusable and portable means for reducing the perception of harsh tannins and acids, that can be applied at any point during the manufacturing process. In the wine making process there are several points at which a wine maker may wish to influence the level of tannic acidity. Wine making begins at crush and the juice is then piped to fermentation tanks. From fermentation it is piped to barrels for aging. After some months these barrels may be blended together and allowed to age further. The wine is then piped into a final blending tank and finally to the bottling line. Various wine makers have expressed an interest in applying this magnetic field at any time, during the manufacturing process, that they deem the levels of tannin to be higher than they would ideally desire at that stage of production.

The permanent magnet may be composed of any material suitable for use and able to achieve the minimum gauss strength required to produce the desired results. While a minimum magnetic field for accomplishing the objectives of the invention has not been established, minimums are expected to exist. The invention is to be practiced utilizing whatever gauss strength is deemed most efficient for achieving the desired results.

What is claimed is:

1. A device for treating wine comprising:

a coaster comprising a housing and a magnet, having at least two poles, said magnet being disposed within said housing wherein said magnet has a sufficient gauss level and strength above 3000 gauss so that when a bottle of wine is placed on said coaster with one of said at least two poles of said magnet pointing towards said bottle of wine for no more than thirty minutes, said coaster creates a perception of a reduction of a sufficient amount of tannins within said bottle of wine to improve the taste of the wine.

2. A device for treating wine comprising:

a coaster comprising a housing and a magnet, said magnet being disposed within said housing, wherein said magnet has a sufficient gauss level and strength so that when a bottle of wine is placed on said coaster for no more than approximately thirty minutes, said coaster creates a perception of a reduction of a sufficient amount of tannins within said bottle of wine to improve the taste of the wine.

3. The device as in claim 2, wherein said magnet has at least two fields.

4. The device as in claim 3, wherein at least one of said at least two magnetic fields points towards said bottle of wine.

5. The device as in claim 3, wherein only one of said at least two magnetic fields points towards said bottle of wine.

6. A device for treating wine comprising:

a magnet, shaped as a coaster, wherein said magnet has a sufficient magnetic strength so that when a bottle of wine is placed on said coaster for no more than approximately thirty minutes, said magnetic coaster creates a perception of a reduction of a sufficient amount of tannins within said bottle of wine to improve the taste of the wine.

7. A method for improving the taste of wine comprising:

providing a coaster having a magnet;

placing a container of wine on said coaster;

leaving said container of wine on said coaster for a sufficient period of time, wherein said magnet, which produces a magnetic field, acts on the wine to create a perception of a reduction of a sufficient amount of tannins within said container of wine to improve the taste of the wine.

8. The process as in claim 7, wherein said step of leaving said container of wine on said coaster includes leaving said container of wine on said coaster for no more than approximately thirty minutes.

* * * * *